(12) United States Patent
Kinoshita

(10) Patent No.: US 6,349,563 B1
(45) Date of Patent: Feb. 26, 2002

(54) DEVICE AND METHOD FOR DESALINATING SALT WATER AND METHOD OF PRODUCING CARBON DIOXIDE EXHAUSTING MEANS

(76) Inventor: Mikio Kinoshita, 740-23-402, Kudencho, Sakae-ku, Yokohama-shi, Kanagawa (JP), 247-0014

(*) Notice: Subject to any disclaimer, the term of this patent is extended or adjusted under 35 U.S.C. 154(b) by 0 days.

(21) Appl. No.: 09/647,282
(22) PCT Filed: Apr. 12, 1999
(86) PCT No.: PCT/JP99/01919
§ 371 Date: Sep. 26, 2000
§ 102(e) Date: Sep. 26, 2000
(87) PCT Pub. No.: WO99/52827
PCT Pub. Date: Oct. 21, 1999

(30) Foreign Application Priority Data

Apr. 14, 1998 (JP) .......................... 10-117886

(51) Int. Cl.$^7$ .......................... F25B 15/00; F25B 27/00; B01D 3/10
(52) U.S. Cl. .......................... 62/476; 62/235.1; 203/10; 202/185.1
(58) Field of Search .......................... 62/93, 271, 476, 62/235.1; 203/10; 202/185.1, 174

(56) References Cited

U.S. PATENT DOCUMENTS

| 5,123,481 A | * | 6/1992 | Albers et al. | 165/111 |
| 5,182,921 A | * | 2/1993 | Yan | 62/235.1 |
| 5,233,843 A | * | 8/1993 | Clarke | 62/271 |
| 5,448,892 A | * | 9/1995 | Cheng | 62/532 |
| 5,899,092 A | * | 5/1999 | Le Goff et al. | 62/476 |
| 6,176,101 B1 | * | 1/2001 | Lowenstein | 62/484 |

FOREIGN PATENT DOCUMENTS

JP 58-88002 A * 5/1983

* cited by examiner

Primary Examiner—William C. Doerrler

(57) ABSTRACT

A salt water desalinating device, characterized by having an absorption refrigerating machine using a first dilute salt water and concentrated salt water and characterized in that a second dilute salt water to be desalinated is evaporated by heat flowing out from the high-temperature heat source of the absorption refrigerating machine and vapor evaporated from the second dilute salt water is condensed by heat to be absorbed to a refrigeration source. A plurality of the absorption refrigerating machines may be series-connected in a series arrangement. A method of desalinating salt water comprising the steps of supplying a first dilute salt water to a refrigeration source, supplying concentrated salt water to a high-temperature heat source, discharging the first dilute salt water having a high concentration after water evaporation, discharging the concentrated salt having a low concentration after water absorption, discharging the second dilute salt water having a high concentration after water evaporation and recovering condensed fresh water.

6 Claims, 2 Drawing Sheets

DEVICE AND METHOD FOR DESALINATING SALT WATER AND METHOD OF PRODUCING CARBON DIOXIDE EXHAUSTING MEANS

TECHNICAL FIELD

The present invention relates to a desalinating apparatus using an absorption refrigerator which utilizes natural energy, a desalination system, a method of desalinating saline water, and a method of producing right of emitting carbon dioxide, and more particularly relates to a desalinating apparatus using an absorption refrigerator of open-regeneration type which utilizes dilute saline water and concentrated saline water, a desalination system, a desalinating method, and a method of producing right of emitting carbon dioxide.

BACKGROUND ART

In an arid region, a region where soil is deteriorated with salt, or a region where severe contamination of water takes place, supply of fresh water is an important issue, which can be utilized for household use, industrial use, agricultural use, improvement of soil properties, prevention of salt-precipitation in soil, or the like. In addition, regulation over carbon dioxide emission into the atmosphere with the consumption of fossil fuel is focused on in recent years, in connection with issues on the global greenhouse effect. Therefore, a transaction of a right of emitting carbon dioxide is also under consideration. In this context of the global greenhouse effect, there are attempts for removing carbon dioxide from the atmosphere through regeneration (recover) of vegetation in arid regions. When fresh water produced by a desalination process is utilized for this purpose, the subject is how to desalinate saline water using natural energy.

As background arts for desalinating saline water such as seawater, there are a multi-stage flash distillation method, a multi-effect distillation method, a reverse-osmosis method, an electrodialysis method, a vapor compression method, a freezing method, and so on. Even when the reverse-osmosis method is employed, which is considered to consume smaller amount of energy in desalinating seawater, electricity of 7kWh is practically consumed in producing 1 ton of fresh water. Therefore, a practice of such desalination is actually accompanied by a large amount of fossil fuel-consumption, which gives rise to problems from a point of view of costs, saving energy, reducing carbon dioxide emission, and so on.

Desalination which utilizes solar energy and which does not consume fossil fuel has been widely tried. For example, a system which produces fresh water by a reverse osmosis method utilizing electricity generated by a solar thermal generator or solar batteries and another system which produces fresh water by a distillation method which utilizes differential temperature of seawater or solar thermal energy have been studied. However, there are problems in costs. Although throughput of a multi-effect distillation method which utilizes solar thermal energy is of several 10 kg/day per unit area (1 square meter) of solar radiation, which is relatively large, the problem is that the costs of obtaining a durable structure against natural conditions such as a strong wind or an adhesion of sands are remarkably increased.

As a kind of heat-pump which is employed in an air-conditioning and heating system, absorption refrigerators are widely spread, which utilize thermal energy. As a heat source for these, solar thermal energy etc. other than the fossil fuel can be utilized. A type of absorption refrigerator having an open-regeneration field is known, which employs a solution of lithium bromide or calcium chloride and which utilizes solar thermal energy. This is a system suitable for arid regions. However, there are few studies on this absorption refrigerator for desalination. Furthermore, there are few studies on structure of a low-cost absorption refrigerator which is fit for desalination utilizing natural energy.

DISCLOSURE OF THE INVENTION

The present invention is made in view of the above-mentioned subjects, and an object of the present invention is to develop a novel fresh water resource therefor. Another object of the present invention is to provide a novel desalinating apparatus which utilizes natural energy. Yet another object of the present invention is to provide a novel desalination system which utilizes natural energy. Still another object of the present invention is to provide a novel method of desalinating saline water which utilizes natural energy. Still another object of the present invention is to provide a novel method of producing right of emitting carbon dioxide which contributes to control over atmospheric emission of carbon dioxide in desalinating saline water. Still another object of the present invention is to provide a novel method of producing right of emitting carbon dioxide, which stimulates fixation of carbon dioxide of atmosphere by means of vegetation which are produced through desalinated saline water. Accordingly, the above-mentioned objects and other related objects are achieved by the present invention disclosed herein.

Namely, a desalinating apparatus according to an embodiment of the present invention includes an absorption refrigerator which operates using concentrated saline water and first dilute saline water. The features are that second saline water for desalination is evaporated utilizing heat which flows out from a high-temperature heat source of the absorption refrigerator, and that fresh water is obtained through condensation of water vapor which has been evaporated from the second saline water utilizing heat which flows in a refrigeration source of the absorption refrigerator.

In the above desalinating apparatus, plural absorption refrigerators may be employed, which may be disposed in series in a serial arrangement.

A desalinating apparatus according to another embodiment of the present invention includes a plurality of absorption refrigerator units, each includes a refrigeration source plate having no water-permeability, a first dilute saline water holding member which is brought into close contact with a surface of the refrigeration source plate, a high-temperature heat source plate having no water-permeability, a concentrated saline water holding member which is brought into close contact with a surface of the high-temperature heat source plate and which is disposed opposite the first dilute saline water holding member, and a second dilute saline water holding member which is brought into close contact with another surface of the high-temperature heat source plate. Further, the plurality of absorption refrigerator units are aligned in series in a serial arrangement, wherein each second dilute saline water holding member is disposed opposite another surface of the adjacent refrigeration source plate.

In the above desalinating apparatus, each of the plurality of absorption refrigerator units may further include a fresh water holding member which is brought into close contact with another surface of the refrigeration source plate.

In the above desalinating apparatus, a plurality of gap-keeping members may further be provided for keeping within a prescribed range a gap between the first dilute saline water holding member and the concentrated saline water holding member and a gap between the second dilute saline water holding member and the refrigeration source plate.

In the above desalinating apparatus, the serial arrangement may be made along a closed line.

In the above desalinating apparatus, a vacuum system may further be provided, which includes a vacuum chamber in which a space including the plurality of absorption refrigerator units is evacuated so as to have substantially the same pressure.

A desalination system according to yet another embodiment of the present invention includes means for supplying first dilute saline water, means for supplying concentrated saline water, means for supplying second dilute saline water for desalination, an absorption refrigerator which utilizes the concentrated saline water and the first dilute saline water, means for evaporating the second dilute saline water, which utilizes heat flowing out from the high-temperature heat source of the absorption refrigerator, and means for collecting condensed fresh water, which condense the water vapor evaporated from the second dilute saline water utilizing heat flowing in the refrigeration source of the absorption refrigerator.

In the above desalination system, means for heating the concentrated saline water and means for heating the dilute saline water may further be provided. In this case, means for exchanging heat of water which flows in the absorption refrigerator for that of water which flows out therefrom.

In the above desalination system, a vacuum system which evacuates the absorption refrigerator may further be provided.

In the above desalination system, a salt-precipitation field which re-concentrate the concentrated saline water in which a salt-concentration thereof has been decreased.

A method of desalinating saline water using an absorption refrigerator according to still another embodiment of the present invention includes the steps of supplying first dilute saline water to a refrigeration source of the absorption refrigerator, supplying concentrated saline water in which molar salt-concentration thereof is higher than that of the first dilute saline water to a high-temperature heat source of the absorption refrigerator, supplying second dilute saline water for desalination to the absorption refrigerator, draining the first dilute saline water in which salt-concentration thereof has been increased due to evaporation of water, draining the concentrated saline water in which salt-concentration thereof has been decreased due to absorption of water, draining the second dilute saline water in which salt-concentration thereof has been increased due to evaporation of water, and collecting condensed fresh water. Features of the method of desalinating saline water are that the fresh water for desalination is produced through evaporation of the second dilute saline water using heat flowing out from the high-temperature heat source of the absorption refrigerator and through condensation of water vapor which has evaporated from the second dilute saline water using heat absorbed in the refrigeration source of the absorption refrigerator.

In the above desalinating method, the step of regenerating the concentrated saline water which re-evaporates water of the concentrated saline water in which concentration thereof has been decreased due to absorption of water may further be provided.

In the above desalinating method, the step of evacuating the absorption refrigerator may further be provided.

In the above desalinating method, the step of heating the first dilute saline water, the second dilute saline water, and the concentrated saline water supplied. In this case, the step of exchanging heat of the first dilute saline water, the second dilute saline water, and the concentrated saline water supplied for heat of the first dilute saline water, the second dilute saline water, the concentrated saline water exhausted, and the fresh water collected, may further be provided.

A method of producing right of emitting carbon dioxide is provided according to still another embodiment of the present invention. This substitutes a desalination system which emits a high amount of carbon dioxide to a desalination system which utilizes natural energy, and obtains a right of emitting carbon dioxide by operating the desalination system which utilizes natural energy according to the above-mentioned method of desalinating saline water.

A method of producing right of emitting carbon dioxide according to still another embodiment of the present invention may produce a right of emitting carbon dioxide through the step of fixing carbon dioxide of the atmosphere, wherein vegetation is grown using the fresh water which is produced as described above.

BEST MODE FOR CARRYING OUT THE INVENTION

Figure 1:
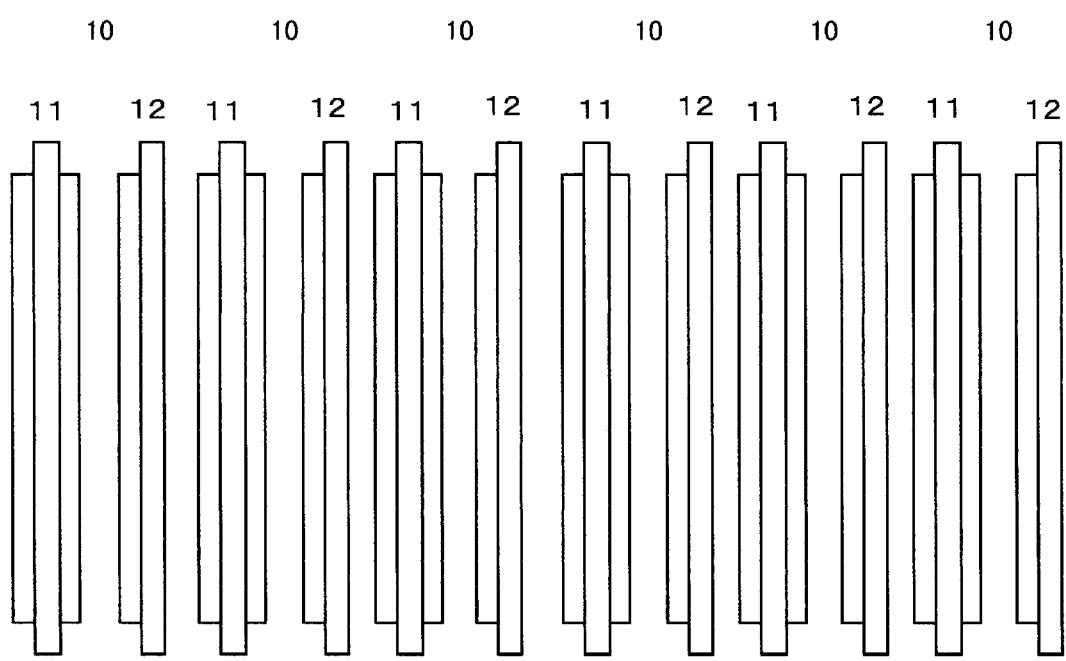
FIG. 1 is a conceptual view illustrating an outline of a desalinating apparatus according to an embodiment of the present invention.
Figure 2:
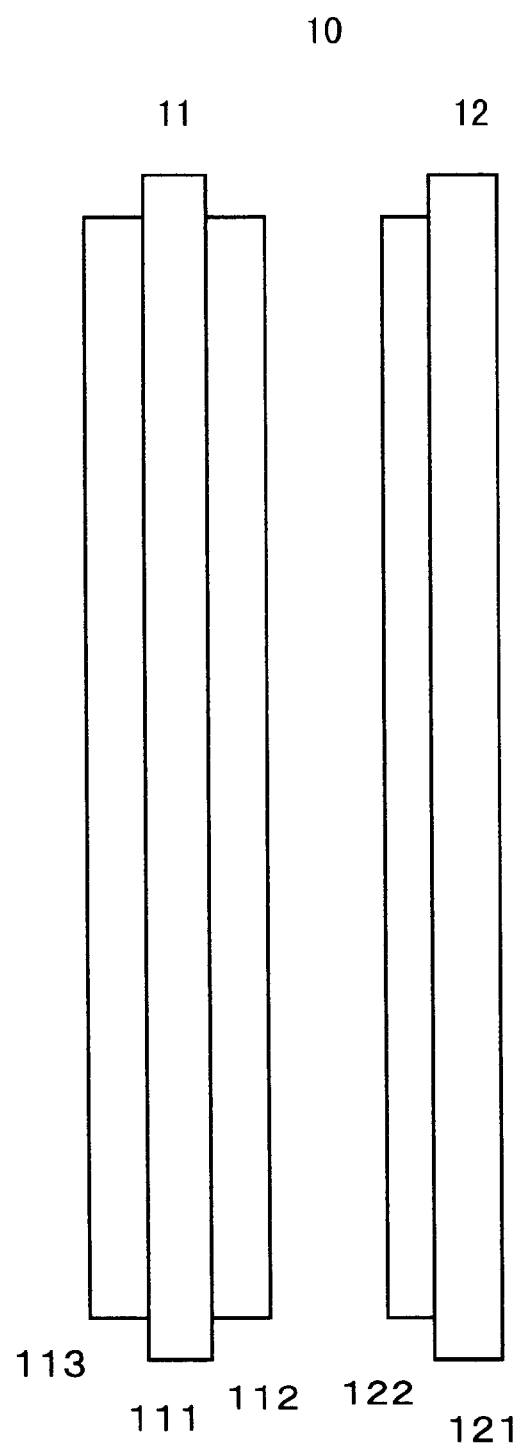
FIG. 2 is a conceptual view illustrating an outline of one unit of an absorption refrigerator which is employed in the desalinating apparatus of FIG. 1.

Referring to FIG. 1 and FIG. 2, preferred embodiments of the present invention are explained. However, any known structure may be employed as a structure of an absorption refrigerator which is employed in a desalinating apparatus of the present invention.

FIG. 1 illustrates an outline of an example according to an embodiment of the present invention. Further, FIG. 2 illustrates an outline of one absorption refrigerator unit which is employed in the embodiment of FIG. 1.

The absorption refrigerator 10 illustrated in FIG. 2 includes a high-temperature heat source 11 having a high-temperature heat source plate 111 having no water-permeability and a refrigeration source 12 having a refrigeration source plate 121 having no water-permeability. The high-temperature heat source plate 111 having no water-permeability and the refrigeration source plate 121 having no water-permeability are disposed opposite each other. A concentrated saline water holding member 112 is disposed so as to be brought into close contact with a surface of the high-temperature heat source plate 111. Further, a first dilute saline water holding member 122 is disposed so as to be brought into close contact with a surface of the refrigeration source plate 121. The concentrated saline water holding member 112 and the first dilute saline water holding member 122 are disposed opposite each other with a prescribed distance. Further, this absorption refrigerator alone can operate as a desalinating apparatus.

In the example according to the embodiment as mentioned above, 6 units of absorption refrigerators 10, each has the structure illustrated in FIG. 2, are aligned in series in a serial arrangement, where the serial arrangement implies that the refrigeration source of one absorption refrigerator unit is thermally connected with the high-temperature heat source of the adjacent absorption refrigerator unit. In FIG. 1, the refrigeration source 12 of one absorption refrigerator unit 10 is disposed opposite the high-temperature heat source 11 of the adjacent absorption refrigerator unit 10. The number of the absorption refrigerators is 6. However, any number thereof may be aligned.

Principle of operation of the desalination according to the present invention is briefly described as follows. Namely, a partial pressure of saturated water vapor which is in equilibrium with first dilute saline water that is supplied to the first dilute saline water holding member 122 is higher than a partial pressure of concentrated saline water which is held by the concentrated saline water holding member 112 and which has a higher temperature than that of the first saline water. Therefore, water vapor which has evaporated from the first saline water having low temperature is absorbed in the opposite concentrated saline water which has the high temperature, through one-directional diffusion of water vapor. In this case, heat of the first dilute saline water having a low temperature is transferred to the concentrated saline water having a high temperature. This is a kind of heat-pump, and constitutes an absorption refrigerator. The differential temperature obtained is large when the differential concentration of the saline water is large. The high-temperature heat source is on the concentrated saline water, and the refrigeration source is on the first saline water. Second dilute saline water for desalination is thermally connected with another side of the high-temperature heat source. Water vapor which has been evaporated therefrom travels to the refrigeration source, and is condensed. Hereinafter, a region where water vapor is condensed is referred to as a water vapor condensation region. The water vapor travels through one-directional diffusion in this embodiment.

An amount of the above-mentioned traveling water vapor from the first dilute saline water to the concentrated saline water and an amount of the traveling water from the second dilute saline water to the refrigeration source increase with the decrease of the total pressure. Therefore, a heat-flow originated in the evaporation and condensation increases. Further, the amount of the traveling water vapor increases when partial pressure of water vapor is large or the temperature is high. Therefore, a throughput of water produced per unit area per unit time increases. Furthermore, the amount of the traveling water vapor is large when a path-length of the traveling water vapor is short, and is large when the differential concentration of salt between the concentrated saline water and the first dilute saline water is large. In addition, a region of operation-temperature of the absorption refrigerator of this example according to the embodiment is not beyond the boiling point of the saline water, and is preferably not beyond a boiling point of fresh water. More preferably, a suitable temperature may be set according to the above-mentioned reasons. Note that these boiling points vary with the variation of total pressure and variation of salt concentration.

According to the above-mentioned principles of operation, appropriate means for enhancing operations of the apparatus may further be provided. For example, (1) plural gap-members for preventing contact of the concentrated saline water with the first dilute saline water or for preventing contact of the fresh water with the second dilute saline water, when a gap where the water vapor diffuses through one-directional diffusion is set short, (2) a vacuum system for establishing the same vacuum state in a space where the plural absorption refrigerator are arranged, (3) means for heating which enable an operation at a high temperature, (4) means for collecting condensed fresh water properly, and so forth may further be provided. When the fresh water holding member for introducing condensed water is brought into close contact with the surface of condensation of fresh water, growth of large drops of fresh water is prevented, which is effective in preventing the contact with the second dilute saline water.

Further, attachments for properly operating the above-mentioned operations are attached, if necessary, in order to meet the operational conditions, apparatus configuration, and the environments. For example, an outer wall or a container (not shown) may further be provided to establish airtightness against the outside and to make a structure such that water vapor is not scattered toward the outside by a strong wind or the like. Furthermore, a side-wall or the like may further be provided, if necessary, which divides a gap of each absorption refrigerator 10 from a gap between the fresh water condensing region and the second dilute water, and which prevents diffusion of water vapor from passing through a side of the gap to the other gaps. In addition, a saline concentration sensor, a thermometer, a vacuum gauge, a water-flow controller, a gap-sensor, a fixing member or jig for each member, a gap regulating member, a gap-length varying mechanism, a vacuum pump, a vacuum chamber, a water processing apparatus, a sterilizing means, and so forth may further be provided, which are the attached means for preferably realizing this embodiment.

In connection with the above-mentioned supplying/draining of the saline water, a water-container, a tube, a watercourse, an appended watercourse made of a permeating member, a watercourse based on difference between surface tension, dropping means, and so forth are further provided, and are optionally miniaturized or configured so as to have a proper configuration thereof. The means for supplying/exhausting water are designed so that distribution of differential concentration in a region where the concentrated saline water and the first dilute saline water are facing each other and that distribution of concentration of the second saline water becomes proper.

When the concentrated saline water is re-evaporated in a salt-precipitation field, which will be described later, the concentrated saline water is preferably configured so as not to be mixed with the dilute saline water during draining. The fresh water is exhausted so as not to be contaminated with salt. However, in some cases, a small amount of a saline element may be added thereto.

As a material of the high-temperature heat source plate 111 and the refrigeration source plate 121, plastics, a metal, a composite material of paper and plastics, and so forth may be employed. Known material such as sponge made of hydrophilic material, woven cloth, non-woven cloth, paper, or the like, which permeates saline water, may be employed. In addition, it may be a coating material including a hydrophilic group with which a plate is coated. A piece of sponge of cellulose or the like, a sheet of woven cloth, a sheet of non-woven cloth, a sheet of paper, and so forth may be glued to the plate. Alternatively, in view of facilitating recycling and maintenance, it may be brought into close contact with the plate using an attachment member for facilitating separation thereof from the plate. There are some cases in which permeation-state varies slightly because of difference in surface tension between the concentrated saline water and the first dilute saline water. Further, respective surfaces of the high-temperature heat source plate and the refrigeration source plate are disposed normal to the horizontal plane.

Alternatively, they may be disposed obliquely or horizontally. Further, a portion of the known material which permeates the above-mentioned saline water may be substituted to a bare saline water-surface.

The high-temperature heat source plate 111, the refrigeration source plate 121, the first dilute saline water holding member 122, the concentrated saline water holding member 112, and the second dilute saline water holding member 113 are preferred so that respective thicknesses thereof are thin, from a point of view in maintaining a good thermal conductive relationship. Further, a large output of the absorption refrigerator 10 is obtained when the gap is short. This length is adjusted to have a prescribed value. Needless to say, the gap-length is optional, provided that mixing of the concentrated saline water with the first dilute saline water does not take place. However, it is preferred so as to be no more than 10 mm when it is employed in an atmospheric pressure. As an option of the present invention, a thickness of 0.3 mm for the high-temperature heat source plate, a thickness of 0.3 mm for the refrigeration source plate, a thickness of 0.3 mm for the first dilute saline water holding member, a thickness of 0.3 mm for the second dilute saline water holding member, a thickness of 0.3 mm for the concentrated saline water holding member, a gap-length of 3 mm of the facing-region between the concentrated saline water holding member and the first dilute saline water holding member, and a gap-length of 3 mm of the facing-region between the second dilute saline water holding member and the refrigeration source plate may be selected. Note that the values regarding these thicknesses are described for the purpose of illustration and not for limiting.

In case of a gap having an extremely short length, from a point of view in keeping precisely a length of the gap and preventing contact of the concentrated saline water with the first saline water, the gap keeping members may exist in the gap. The material or the shape thereof is selected so that a saline element or solution does not move via the gap keeping members. Such gap keeping members may also be employed for adjusting the gap between the second dilute saline water and the condensation-surface. The gap keeping members, which prevent mixing of the concentrated saline water with the first dilute saline water or mixing of the second dilute saline water with the fresh water, are effective in increasing a throughput per unit area and miniaturizing the apparatus. The gap keeping members are disposed at a prescribed interval. When the gap is short, when rigidity of the plate is insufficient, or when shape of the plate is deformed with time, the gap members are disposed densely.

Further, as a form of heating the apparatus according to this example according to the embodiment, the end of the refrigeration sources may be irradiated with solar radiation. The end of the high-temperature heat sources may disperse heat through evaporation of the second dilute saline water. Alternatively, the heating may be from the side. Further, an insulating material or the like may be employed. In this case, the desalinating apparatus may be disposed in a container made of a transparent insulating material such as double-layered glass, and may be heated by a solar light. A hothouse may also be employed.

Further, in order to utilizing heat efficiently, a heat-exchanger may further be provided, which heats the first dilute saline water, the concentrated saline water, and the second dilute saline water introduced, utilizing thermal energy of the first dilute saline water, the second dilute saline water, the concentrated saline water exhausted and the fresh water. Heat is interchanged between the introduced matter and the exhausted matter via a high conductive member of the heat-exchanger so that a temperature of the exhausted matter approaches that of the introduced matter. Namely, saving energy is achieved, because the first dilute saline water, the second dilute saline water, and the concentrated saline water introduced are heated utilizing heat of the first dilute saline water, the second dilute saline water, the concentrated saline water exhausted, and the fresh water collected.

Alternatively, when the desalinating apparatus is disposed in a vacuum chamber having a degree of vacuum, a diffusion coefficient of water vapor increases, and a high throughput is also obtained even if the operation temperature is set at a room-temperature. Evacuation may be done using a vacuum pump, or a Torricelli's vacuum may be employed. The pressure is in a region not below a saturated pressure of the water at the operation temperature. Namely, the pressure in the vacuum chamber, in this case, is kept in a region where the first dilute saline water does not boil. When the gap is short, the operation may be done in a vacuum state in which some residual air molecules remain. The vacuum chamber is a airtight chamber of stainless steel, plastics, aluminum, or the like, which has a durable rigidity against differential pressure against the atmospheric pressure, or a non-airtight rigid chamber of a reinforced concrete covered with an airtight soft member of plastic film of polyethylene or the like, for example. In this case, it may be floated on water, or be disposed in water, in order to prevent a damage of the covering member. Alternatively, an airtight basement may be employed as the vacuum chamber.

In the above-mentioned example according to the embodiment, the plural absorption refrigerators 10 having plainer configuration are aligned along a straight line. However, there is also an example according to an embodiment in which they are aligned along a closed line. Namely, a number of absorption refrigerators 10, for example, a number of 10–100000, each having the structure shown in FIG. 2, are aligned serially along a closed polygon, a circle, or an ellipse so that no special end exists and that any high-temperature heat source is disposed next to the adjacent refrigeration source. Shape of the alignment may optionally be adjusted by inserting a high conductive member into the alignment. Accordingly, the heat flows along a closed eddy line.

Although the absorption refrigerator 10 which is employed in the example according to the embodiment is an open regeneration type, any heat source may be employed for regenerating the concentrated saline water. In particular, a salt-precipitation field in an arid region is suitable because of utilization of solar thermal energy or dry air. The salt-precipitation field is a heat source which is remarkably easy in maintenance and which is hardly caused to have bad influence of a strong wind or a cloud of dust.

Because precipitation is extremely little in arid regions, seawater is easily condensed when stored on soil having no water-permeability, and the costs of heat source are extremely low. When supplementary solid salt stored in the salt precipitation field is utilized for preventing decrease of salt-concentration, fluctuation of salt-concentration of the concentrated saline water due to weather conditions can be suppressed, without influence due to precipitation or exceptional lack of sunshine. A water treatment and a water quality management such as prevention of organic matters, fungi, miscellaneous bacteria, etc. is optionally done.

FIG. 1 corresponds to single-effect distillation. When multi-effect distillation is to be done, plural appended plates, each having a second dilute saline water holding member which is brought into close contact therewith, are employed. Further, when the above-mentioned alignment of plural absorption refrigerators is defined as one unit, the plural units may be disposed in one desalinating apparatus.

As another embodiment of the present invention, a desalination system is provided, which includes means for supplying first dilute saline water, means for supplying concentrated saline water, means for supplying second dilute saline water for desalination, an absorption refrigerator which employs the concentrated saline water and the first dilute saline water, means for evaporating the second dilute saline water using heat which flow out from a high-temperature heat source of the absorption refrigerator, means for collecting condensed fresh water, which condenses water vapor evaporated from the second dilute saline water using heat which flows in a refrigeration source of the absorption refrigerator.

As appended means, means for heating the concentrated saline water and means for heating dilute saline water may further be provided. In this case, means for exchanging heat between water which flows in the absorption refrigerator and water which flows out therefrom may further be provided. Alternatively, a vacuum system may further be provided, which evacuates the absorption refrigerator.

Operation as a desalination system utilizing renewable natural energy is achieved, for example, when a salt-precipitation field is further provided, which re-concentrate the concentrated saline water in which salt-concentration has decreased.

As an example according to an embodiment, there is a seawater desalinating system, wherein an infrastructure is provided for each urban house, which is composed of a seawater supply system as means for supplying seawater that can be employed as both of means for supplying a first dilute saline water and means for supplying second dilute saline water, and a concentrated saline water supply/drainage as means for supplying concentrated saline water, wherein the above desalinating apparatus system is provided in each house. In this case, the desalinating apparatus is expected to have the volume corresponding to the household refrigerator. Because fresh water produced is distilled water, it is clean. Mineral elements may be added thereto, if necessary.

An embodiment of a desalination system according to the present invention is not limited to this example. For example, as another example according to an embodiment, there is a desalination system in which desalination is done collectively in a suburban salt-precipitation field.

As still another embodiment of the present invention, an example of a desalinating method according to the present invention is explained about the operation of the above-mentioned desalinating apparatus, referring to FIG. 1 and FIG. 2.

According to a step of supplying first dilute saline water to a refrigeration source of an absorption refrigerator, the first saline water is supplied to a first dilute saline water holding member 122. According to a step of supplying concentrated saline water having a higher molar salt-concentration than that of the first dilute saline water to a high-temperature heat source of the absorption refrigerator, the concentrated saline water is supplied to a concentrated saline water holding member 112. Water vapor evaporated from the first dilute saline water diffuses through a gap, and is absorbed in a surface of the concentrated saline water holding member 112. Through this evaporation, evaporative latent heat is taken from the refrigeration source 12, and the latent heat by absorption is released for the high-temperature heat source, thereby an operation as an absorption refrigerator is achieved. A second dilute saline water holding member 113 is brought into close contact with another surface of a high-temperature heat source plate 111, which is on the reverse side for the concentrated saline water holding member 112. According to a step of supplying second dilute saline water for desalination to the absorption refrigerator, the second dilute saline water for desalination is supplied to the second dilute water holding member 113. Because the second dilute saline water holding member 113 and the concentrated saline water holding member 112 are separate from each other, mixing due to contact of the concentrated saline water with the second dilute saline water does not take place. Fresh water condenses on a surface of a refrigeration source plate 121, which is on the reverse side for first dilute saline water holding member 122. The concentrated saline water supplied from the top descends by gravity, which is exhausted according to a step of draining the concentrated saline water in which salt-concentration has decreased due to absorption of water. Also, the first dilute saline water and the second dilute saline water supplied from the top descends by gravity, respectively, and are exhausted according to a step of draining the first dilute saline water in which salt-concentration has increased due to evaporation of water, and a step of draining the second dilute saline water in which salt-concentration has increased due to evaporation of water. The fresh water is collected according to a step of collecting the fresh water condensed.

As a kind of salt which is employed for this absorption refrigerator, known salt having water-solubility such as sodium chloride, calcium chloride, potassium chloride, magnesium chloride, zinc nitrate, ammonium sulfate, lithium bromide, sodium bromide, etc., and mixture thereof may be employed. Also, concentrated seawater may be employed. The first dilute saline water is a saline water having a lower molar salt-concentration than that of the concentrated saline water. Seawater or saline groundwater may be employed. Difference of molar elevation of boiling points between the concentrated saline water and the first dilute saline water is in a range so that it sufficiently exceeds the value of molar elevation of boiling point of the second dilute saline water. Namely, the necessary condition for desalination using the single-effect absorption refrigerator is that temperature difference generated by the absorption refrigerator sufficiently exceeds the value of molar elevation of boiling point of the second dilute saline water for desalination. Specifically, the first dilute saline water and the second dilute saline water may be the same kind of saline water. Further, a multi-effect absorption refrigerator may be employed.

Hereinafter, as an example of an operation for facilitating explanation, a method of producing fresh water according to the embodiment is explained assuming that concentrated seawater is employed as the concentrated saline water, and that seawater is employed as the first dilute saline water and the second dilute saline water. This example is not limiting utilization of any kinds of saline water, as mentioned above.

In this case, an initial concentration of the concentrated sea water is approximately equal to or more than 10%, preferably equal to or more than 15%. An initial concentration of the first dilute saline water and the second dilute saline water is about 3.5%. Supply and exhaustion are done to achieve a range of a salt-concentration such that temperature difference between the second dilute saline water holding member 113 and the refrigeration source plate 121 becomes sufficiently larger than molar elevation of boiling point of the second dilute saline water in each facing region, using means for supplying/draining the first dilute saline water, means for supplying/draining the second dilute saline water, means for supplying/draining the concentrated saline water, which means are not shown. Supply/exhaustion of respective kinds of saline water and collection of the fresh water are appropriately done using a tube, a watercourse, a watercourse made of an appended permeating member, a dropping member, a valve, and so forth. Therefore, diffusing water vapor evaporated from the second dilute saline water reaches to the refrigeration source plate 121, and condensed water is generated on the surface of the fresh water condensing region.

In the first dilute saline water and the second dilute saline water, the salt-concentrations increase with evaporation of water thereof, and are kept at an appropriate concentration defined by the quality of water so that a problem of precipitation of scale such as calcium sulfate does not arise. Further, with the absorption of water vapor into the concentrated saline water, the concentration of the concentrated saline water is decreased. The temperature difference between the high-temperature heat source and the refrigeration source of the above-mentioned absorption refrigerator becomes large when the difference of salt-concentration is large. Management of concentrations is important in supplying/draining these kinds of saline water, in order to obtain a prescribed temperature difference for the concentration of the second dilute saline water in a wide range of concentration.

When decrease in salt-concentration of the concentrated saline water which has been once drained is relatively small, a combination of the drained concentrated saline water and the first dilute saline water having an initial concentration may be re-supplied to the absorption refrigerator. Similarly, when increment of the salt-concentration of the first dilute saline water once drained is relatively small, a combination of the first dilute saline water once drained and the concentrated saline water having an initial concentration may be re-supplied to the absorption refrigerator.

A throughput of this example per unit area of the fresh water condensing region is from several to several 100 kg/day. When the gap-length is short, a throughput per unit volume of the apparatus of from several 10 to 100000 kg/day is obtained. Therefore, a small apparatus can achieve a large throughput, and maintenance such as wind-breaking is extremely facilitated.

In the above, when the inside of the absorption refrigerator and a space between the second saline water and the condensing region where the water vapor evaporated from the second dilute saline water condenses is set to have substantially the same pressure, these regions can be evacuated using a single vacuum chamber. Therefore, maintenance of the vacuum system, which requires no complicated vacuum sealing member, is facilitated even if many absorption refrigerators are employed. The vacuum state improves the diffusion coefficient greatly, and improves the throughput per unit time.

Heating of the apparatus or heating of the first dilute saline water, the second dilute saline water, and the concentrated saline water to be introduced is effective in improving throughput under operation at atmospheric pressure. Solar thermal energy or waste heat is utilized for the heating. However, a boiler or electric heating which consumes fossil fuel or electricity may be employed. The kind of salt may be optionally selected, in view of heat of mixing, so that heat of mixing is generated substantially during processes of evaporation/condensing accompanied by dilution of the concentrated saline water and condensation of the first dilute saline water.

In the above, partial pressure of water vapor is increased according to increase of operation temperature of the absorption refrigerator, which achieves increment of throughput according to increase of an amount of diffusion. The increase in temperature is in a range not greater than the boiling point. Even when the vacuum is employed, a slight heating is occasionally effective. In other words, in one mode of operation, heat in the desalinating apparatus is taken out slightly by evacuation of water vapor by the vacuum pump. The heating works for compensating this.

As described above, the present invention achieves fresh water supply using natural energy, and simultaneously provides a novel method of producing a right of emitting carbon dioxide. Namely, when an existing desalinating method is substituted to the method of producing fresh water according to the present invention, a right of emitting carbon dioxide is produced according to reduction of carbon dioxide emission. Further, when vegetation is grew as means for fixing carbon dioxide in the atmosphere, a right of producing carbon dioxide is produced according to the reduction of carbon dioxide emission corresponding to an amount of photosynthesis in the vegetation.

The present invention disclosed herein provides a novel desalinating apparatus, a desalination system, a method of desalinating saline water, and a method of producing right of carbon dioxide, wherein in view of the teachings disclosed in the above-mentioned detailed explanation, a practice of the present invention is not limited to the above-mentioned examples for explaining the preferred embodiments of the present invention, and wherein the present invention may be practiced as other embodiments with variations within the scope of the claims as follows or may be practiced without supplementary forms or elements which are appended for explaining the preferred embodiments.

Industrial Applicability

With the operation of the absorption refrigerator using concentrated saline water and dilute saline water, the desalinating apparatus according to the present invention provides water for household use, agricultural use, and industrial use in an arid region, a region having problems related to salt precipitation, a region where fresh water is short, or a region where severe water-pollution due to a nonvolatile hazardous material exists. The desalination system according to the present invention achieves desalination using natural energy. Further, a business is enabled for preserving global environment, which is accompanied by reduction of carbon dioxide emission or fixing of carbon dioxide in the atmosphere, in connection with global environmental issues. Further, it contributes to improvement of soil in a region where problems related to salt-precipitation take place or to prevention of problems related to salt-precipitation which is accompanied by variation of underground water level.

What is claimed is:

1. A desalinating apparatus, comprising a plurality of absorption refrigerator units, each including:
   a refrigeration source plate having no water-permeability;
   a first dilute saline water holding member which is brought into close contact with a surface of the refrigeration source plate;
   a high-temperature heat source plate having no water-permeability;
   a concentrated saline water holding member which is brought into close contact with a surface of the high-temperature heat source plate, and which is disposed opposite the first dilute saline water holding member; and a second dilute saline water holding member which is brought into close contact with another surface of the high-temperature heat source plate, wherein the plurality of absorption refrigerator units are aligned in series in a serial arrangement, and wherein each of the second dilute saline water holding member in the serial arrangement is disposed opposite another surface of the adjacent refrigeration source plate.

2. The desalinating apparatus according to claim 1, wherein the serial arrangement is made along a closed line.

3. A method of desalinating saline water using an absorption refrigerator, comprising the steps of:

supplying a first dilute saline water to a refrigeration source of the absorption refrigerator;

supplying a concentrated saline water having a higher molar elevation of boiling point than that of the first dilute saline water to a high-temperature heat source of the absorption refrigerator;

supplying a second dilute saline water for desalination to the absorption refrigerator;

draining the first dilute saline water in which a salt-concentration thereof has been increased due to an evaporation of water;

draining the concentrated saline water in which a salt-concentration thereof has been decreased due to an absorption of water;

draining the second dilute saline water in which a salt-concentration thereof has been increased due to an evaporation of water; and collecting a condensed fresh water, wherein the second dilute saline water is evaporated utilizing a heat which flows out from the high-temperature heat source of the absorption refrigerator, and wherein the water vapor which has evaporated from the second dilute saline water is condensed utilizing a heat which is absorbed in the absorption refrigerator, thereby obtaining the condensed fresh water.

4. The method of desalinating saline water according to claim 3, further comprising the step of heating the first dilute saline water, the second dilute saline water, and the concentrated saline water supplied.

5. A desalinating apparatus comprising:

an absorption refrigerator including a high-temperature heat source and a refrigeration source, which utilizes a concentrated saline water and a first dilute saline water;

means for supplying the first dilute saline water to the absorption refrigerator, the first dilute saline water being drained from the absorption refrigerator when a salt-concentration thereof has been increased;

means for supplying the concentrated saline water to the absorption refrigerator, the concentrated saline water being drained from the absorption refrigerator when a salt-concentration thereof has been decreased; and means for generating a water vapor from a second dilute saline water supplied for desalination, utilizing a heat which flows out from the high-temperature heat source, the second dilute saline water being drained from the absorption refrigerator when a salt-concentration thereof has been increased; wherein the water vapor generated from the second dilute saline water is condensed utilizing the heat which is absorbed in the refrigeration source.

6. A desalinating apparatus comprising:

a plurality of absorption refrigerators utilizing a concentrated saline water and a first dilute saline water, each absorption refrigerator including a high-temperature heat source and a refrigeration source;

means for supplying the first dilute saline water to each absorption refrigerator, the first dilute saline water being drained from the absorption refrigerator when a salt-concentration thereof has been increased;

means for supplying the concentrated saline water to each absorption refrigerator, the concentrated saline water being drained from the absorption refrigerator when a salt-concentration thereof has been decreased; and means for generating a water vapor from a second dilute saline water supplied for desalination, utilizing a heat which flows out from the high-temperature heat source of each absorption refrigerator, the second dilute saline water being drained from the absorption refrigerator when a salt-concentration thereof has been increased; wherein the plurality of absorption refrigerators are aligned in series in a serial arrangement so that the water vapor generated from the second dilute saline water of the high-temperature heat source of each absorption refrigerator is condensed utilizing the heat which is absorbed in the refrigeration source of the adjacent absorption refrigerator in the serial arrangement.

* * * * *